United States Patent

[11] 3,607,863

| [72] | Inventor | Werner Dosch |
| | | Mainz, Germany |
| [21] | Appl. No. | 619,486 |
| [22] | Filed | Feb. 28, 1967 |
| [45] | Patented | Sept. 21, 1971 |
| [73] | Assignee | Dyckerhoff Zementwerke A.G. |
| | | Wiesbaden-Amoneburg, Germany |

[54] CLATHRATE COMPOUNDS
10 Claims, 9 Drawing Figs.

[52] U.S. Cl............................................................. 260/209,
8/79, 8/82, 23/51, 23/52, 96/61, 96/63, 106/90,
106/314, 252/184, 252/430, 260/413, 260/414,
260/438.5 C, 260/439, 260/448 C, 424/357,
424/366

[51] Int. Cl........................................................C07c 47/18,
C07f 15/02

[50] Field of Search............................................ 106/95,
104; 23/52, 51; 260/414, 448, 448 C, 438.5 C;
424/157, 158

[56] References Cited
UNITED STATES PATENTS

| 3,433,657 | 3/1969 | Pickering...................... | 106/104 |
| 2,996,394 | 8/1961 | Stoll.............................. | 106/95 |
| 2,923,660 | 2/1960 | Hallmann...................... | 23/52 |
| 3,261,700 | 7/1966 | Spence et al.................. | 106/95 |
| 2,953,467 | 9/1960 | Jones et al.................... | 106/95 |

OTHER REFERENCES

Buttler and Taylor, J. Chem. Soc., 2103–2110, (1958).
Carlson, E. T., J. Research NBS, 61[ 1 ], 1–11, (1958).
Roberts, M. H., J. appl. Chem., 7, 543–546 (1957).
Tea & Desch, " The Chemistry of Cement and Concrete,"
Edw. Arnold & Sons pgs. 604, 607, and 612, 1956.

*Primary Examiner*—Tobias E. Levow
*Assistant Examiner*—Watson T. Scott
*Attorneys*—Erich M. Radde, Charles A. McClure, Gerard J. Weiser and Alfred Stapler

ABSTRACT: A composition composed of an inorganic carrier material of the formula $$4 \text{ MeO} \cdot X_2O_3 \cdot n \text{ aq}$$

wherein

Me is an alkaline earth metal,
X is trivalent iron or aluminum,
aq is water of crystallization, and
n is at least 7, having adsorbed thereto or included in its crystal lattice a polar organic compound or a nonpolar organic compound and a polar organic compound. Said carrier material may contain anions such as $SO_4^{-2}$, $CO_3^{-2}$, or $Cl^-$ and may be alkylated.

The resulting adsorption complex, inclusion or clathrate compound is stable, of a high degree of crystalline orderliness, and uniform in its physical and chemical properties.

It is prepared by contacting the inorganic carrier material with the liquid or gaseous organic compound or with its solution. It is also obtained by adding the organic compound during preparation of the inorganic carrier material.

The adsorption complexes, inclusion or clathrate compounds are useful for modifying cement and concrete, for storing insecticides, perfumes, drugs, dyes etc. to be released at the site of their use, and for many other technical purposes.

The inorganic carrier material is obtained, for instance, by reacting mono-or tricalcium aluminate or tetracalcium aluminate ferrite with water or calcium hydroxide suspensions or by reacting alkali aluminate solutions with the oxides or hydroxides of calcium or magnesium.

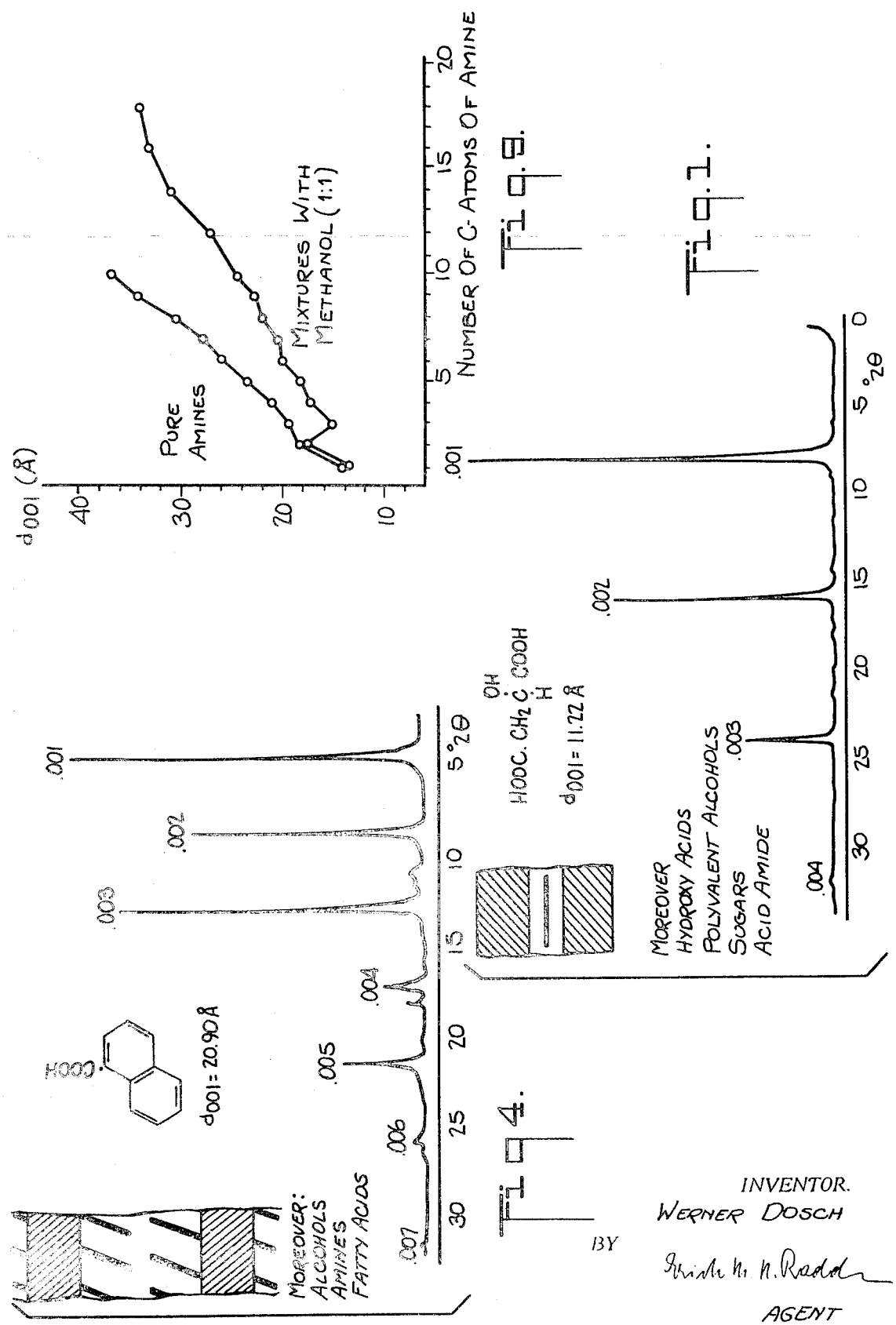

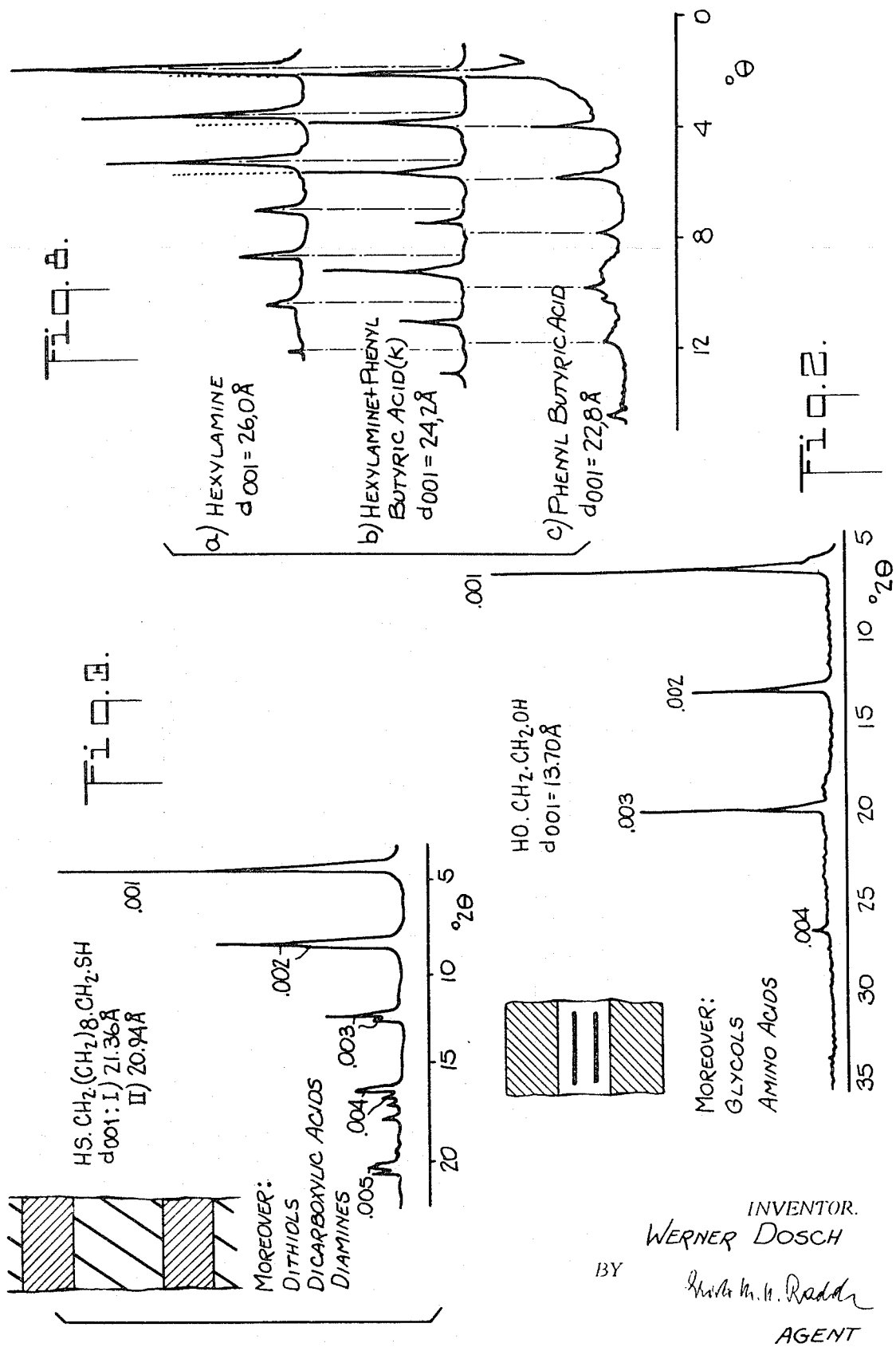

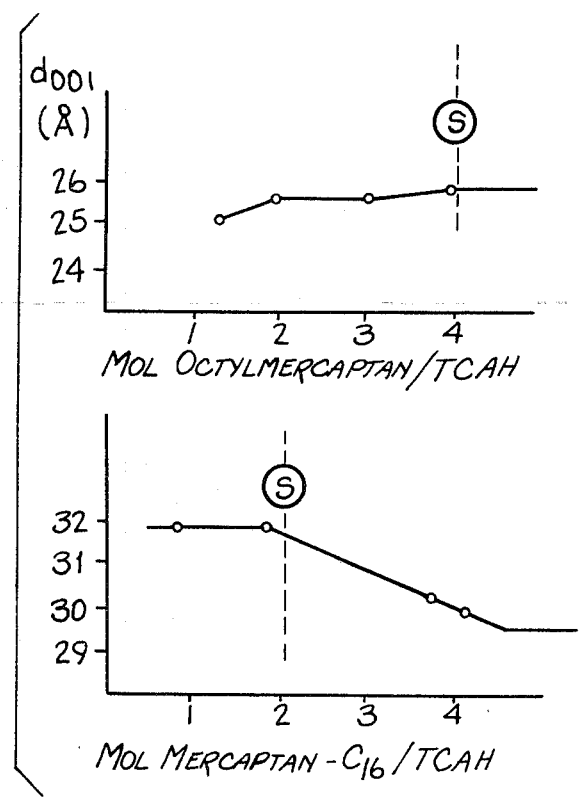
Fig. 6.
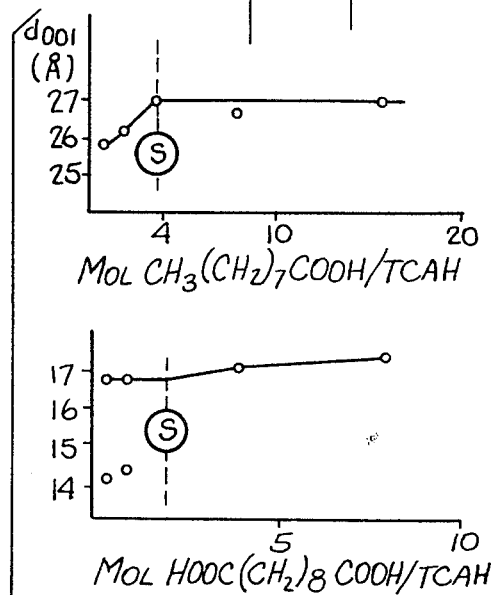
Fig. 7.
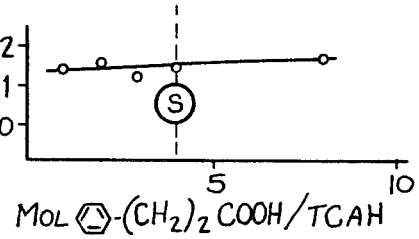
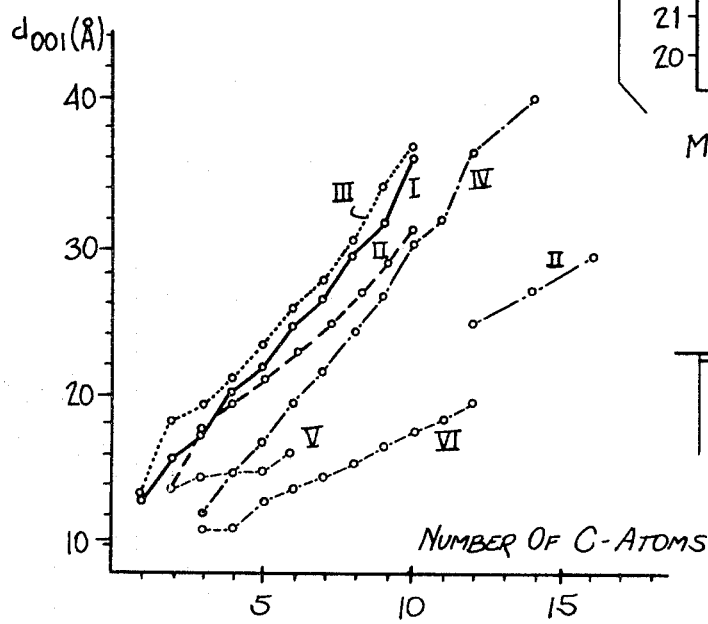
Fig. 5.

CLATHRATE COMPOUNDS

The present invention relates adsorption compositions and more particularly to adsorption compositions or complexes also called inclusion compounds, occlusion compounds, or clathrate compounds, which are composed of an alkaline earth metal aluminate hydrate or an alkaline earth metal ferrite hydrate as adsorbent and an organic compound as adsorbate, and to a process of making and using same.

It is known to combine bentonites and related minerals having laminar structure with organic compounds thereby sorbing said organic compounds to the surface of the bentonite or the like mineral or, respectively, intercalating the organic compound as intracrystalline occlusion into said bentonite or the like material. As a result thereof the properties of the starting organic compounds can be modified considerably so that such adsorption compositions or inclusion compounds can be utilized for various technical purposes.

However, it is a disadvantage of the known mineral carrier materials that they are very complicated natural products of heterogeneous composition which have varying properties depending upon the incidental base minerals constituting them, the variability of the chemical composition of these minerals, and the natural contaminations therein. These carrier materials react also in a different manner with organic compounds. This is the reason why carrier materials of different occurrences may differ fundamentally in their characteristics and may vary in an uncontrolled manner, even if found at the same locality, despite extensive processing.

The known methods of synthesizing such clay minerals are also not satisfactory.

Another disadvantage is that the capability of the bentonites of combining with organic compounds is largely determined by the crystallochemical peculiarity of the bentonites, namely that the individual laminae are not saturated electrostatically but have an excess negative charge (known as macro-anions) which charge is compensated by incorporation of more or less loosely combined cations on interlaminar sites.

The influence of inorganic macro-anions is understandable with respect to the ionic reactions of the bentonites with organic cations (onium compounds) where the incorporation of the organic molecules between the individual laminae of the mineral is directly due to the exchange with the organic cation. However, it has also been observed with respect to the sorption of neutral polar compounds that said sorption is interconnected with type and number of exchangeable cations. In addition, the capability of the bentonites of swelling with organic onium compounds is dependent upon the fact that said clay mineral has a high layer charge and that the carbon chain of the onium compound has a certain number of carbon atoms.

Several synthetic products such as graphite oxide, complex cyanides of trivalent iron and cobalt, $\alpha$-zinc hydroxide, di- and trititanates, and polyphosphates have also been found to have the capability of interlamellar sorption. However, these materials did not find technological use either for their low stability, their high production cost, their toxicity, or for their limited sorptive properties.

The capability of previously known clay minerals which form organic clathrate compounds, of incorporating the organic molecules is closely connected with the fact that the layers of the clays represent macron-anions.

It is now an object of the present invention to provide an adsorption composition or clathrate compound which is composed of an adsorbent or carrier constituted of neutral layers that are completely saturated in themselves and which has a particularly high degree of orderly crystalline arrangement (crystalline orderliness) and is completely uniform in its physical and chemical properties, on the one hand, and of an organic compound which need not be a cationic compound but may be a neutral organic compound as well, on the other hand.

Another object of the present invention is to provide a sample and effective process of making such an adsorption composition or clathrate compound.

A further object of the present invention is to provide a new inorganic carrier material useful for preparing said adsorption or clathrate compounds.

Still another object of the present invention is to provide compositions which have the respective organic compound incorporated therein in a stable adsorbed form permitting their release at the site of use only, such as insecticidal, fungicidal, bactericidal, pharmaceutical, cosmetic, dye compositions, photographic developers, fixing agents, sensitizers, catalysts, and many others.

Other objects of the present invention and advantageous features thereof will become apparent as the description proceeds.

In principle the present invention comprises the preparation and use of an adsorbent or carrier material of the following formula

$$4\text{MeO} \cdot X_2O_3 \cdot 7\,H_2O \cdot n\text{ aq.}$$

wherein
Me is an alkaline earth metal and especially magnesium or calcium;
X is iron in its trivalent form or aluminum;
aq is water of crystallization, and
n is a numeral from 0 to $\Lambda$2 and preferably $n$ $aq$ indicates 0, 4, 5, 6, and 12 moles of water of crystallization. Such inorganic carrier materials are, for instance, tetracalcium aluminate hydrate, tetramagnesium aluminate hydrate, and the corresponding ferrite hydrates. In these minerals the aluminum and iron as well as the calcium and magnesium may replace each other in any proportions. Seven molecules of water are combined as structural water in said compounds. The most suitable minerals contain 7, 11, 12, 13, and 19 moles of water including the structurally combined water.

These inorganic carrier materials contain incorporated or included into their lamellar structure and/or adsorbed thereon organic compounds of the aliphatic, alicyclic, aromatic, or heterocyclic series as adsorbed component.

In the resulting adsorption compositions, or inclusion or occlusion compounds of the present invention the organic molecules are present and intercalated between the individual laminae of the mineral. The adsorption, inclusion, or occlusion of the organic compounds results in an increase in the interlaminar distance. Approximately up to four organic molecules may be incorporated per molecule of the inorganic carrier compound.

The adsorption compositions of this invention avoid the disadvantages of the heterogeneous compositions of the bentonite inclusion, occlusion, or clathrate compounds because the inorganic carrier materials used in accordance with the invention are synthetic products which have, as stated above a particularly high degree of crystalline orderliness and complete uniformity of all physical and chemical properties. Organic adsorption compositions which are well defined and of uniform structure are obtained. In addition, it is possible to prepare with any great number of neutral organic compounds inclusion or clathrate compounds which when using the known bentonites, could be prepared with onium compounds only.

Another advantage of the new adsorption compositions of the present invention is their increased stability as compared with that of the known bentonite occlusion compounds.

Of the new adsorption compositions those with carboxylic acids and aldehydes have been found to be particularly stable.

The inorganic carrier materials which form the adsorption compositions of the present invention are tetracalcium aluminate hydrates and tetramagnesium aluminate hydrates and the corresponding ferrite hydrates in which, as stated above, aluminum and iron may replace each other in any proportion. The same is true for calcium and magnesium.

The organic compounds may also be included in the inorganic layer lattices if the inorganic carrier materials contain inorganic anions such as sulfate $SO_4^{2-}$, carbonate $CO_3^{2-}$, chloride $Cl^{-}$, or other anions. Such carrier materials are, for instance, tricalcium aluminate calcium sulfate compounds of the formula 3CaO.Al$_2$O$_3$.CaSO$_4$.n aq, also designated as "-monosulphate" or mixed crystals of said compound with tetracalcium aluminate hydrate.

Other suitable carrier materials are tetra-alkaline earth metal aluminate hydrates or ferrite hydrates which have been modified by alkylation in a manner known per se.

The adsorption complexes according to the present invention of tetra-alkaline earth metal aluminate hydrates and ferrite hydrates are formed with aliphatic, alicyclic, aromatic, and heterocyclic compounds provided they are not sterically hindered. No inclusion or occlusion takes place with highly branched organic compounds such as sec. butanol, tert. butanol, and tert. amyl alcohol due to steric hindrance. As a general rule, isocompounds are included more slowly than straight chain compounds. Incorporation of a mixture of different organic compounds is possible with the same ease as the inclusion of a single compound.

Polar organic materials are adsorbed, included, or occluded with particular ease. Preferred organic compounds are monohydric aliphatic alcohols, especially those having from one to 10 carbon atoms, glycols, preferably those with two to 10 carbon atoms, polyhydric alcohols such as mannitol, sorbitol, sugars such as arabinose, xylose, glucose, fructose, mannose, galactose, maltose, bioses such as cellobiose, sucrose, lactose, and polysaccharides such as starch, sugar-like compounds such as ascorbic acid. Other compounds which may be used with advantage, are aliphatic mercaptans, preferably those with one to 16 carbon atoms; aliphatic dithiols, especially those with two to 10 carbon atoms; aliphatic monoamines, preferably those with one to 14 carbon atoms, and aliphatic diamines, especially those with one to nine carbon atoms; aliphatic aldehydes, preferably those with one to 16 carbon atoms; aliphatic ketones such as methyl ethyl ketone, methyl isobutyl ketone; aliphatic carboxylic acids, preferably those having from one to 14 carbon atoms; aliphatic hydroxy carboxylic acids such as tartaric acid, citric acid, lactic acid, saccharic acid; aliphatic dicarboxylic acids, preferably those having from two to 10 carbon atoms; aliphatic amino carboxylic acids, preferably $\alpha$- and $\omega$-amino carboxylic acids such as glycocoll, alanine, glutamic acid, glycyl glycine, 1-cysteine, 1-histidine, 1-tyrosine, glycine, valine, leucine, phenyl alanine, proline, hydroxy proline, serine, methionine, tryptophan, asparagine, lysine, $\epsilon$-amino caproic acid; polyamino polycarboxylic acids such as ethylene diamine tetra-acetic acid. Other suitable compounds are aliphatic acid amides such as acetamide, n-butyramide, esters of aliphatic carboxylic acids such as acetic acid methyl, ethyl, propyl, butyl, n-amyl, isoamyl, hexyl, vinyl esters, valeric acid ethyl ester, butyric acid methyl, isoamyl and butyl esters and, for instance, enanthic acid methyl ester. Examples of further suitable compounds include thiocarboxylic acids such as thioglycolic acid and thioacid amides such as thiourea.

Cyclic organic compounds which are particularly suitable include cycloaliphatic alcohols such as cyclohexanol; aromatic alcohols such as benzyl alcohol and homologues thereof such as phenyl propyl alcohol; phenols such as phenol, p-nitro phenol, p-cresol, $\alpha$- and $\beta$-naphthol polyhydric phenols such as pyrogallol; cyclic amines such as cyclohexylamine; aromatic amines such as aniline, p-toluidine, p-nitro aniline, p-chloro aniline, p-anisidine, benzylamine, o-, m-, and p-amino phenols. Occlusion compounds can also be prepared very readily with aromatic aldehydes such as cinnamic aldehyde, hydrocinnamic aldehyde, benzaldehyde, terephthalic aldehyde; cycloaliphatic aldehydes; cycloaliphatic carboxylic acids; aromatic carboxylic acids such as benzoic acid and homologues thereof; cinnamic acid; naphthoic acid; substituted aromatic carboxylic acids such as p-amino benzoic acid, p-toluic acid, p-nitro benzoic acid, p-hydroxy benzoic acid, salicyclic acid, gallic acid, picric acid; polyvalent aromatic carboxylic acids such as phthalic acid, isophthalic acid, terephthalic acid. Moreover, clathrate compounds form with sulfonic acids such as sulfanilic acid. Preferred clathrate compounds are obtained with heterocyclic compounds such as pyridine, piperidine, pyrrolidine, quinoline, 8-hydroxy quinoline, benzothiazole, and mercapto benzothiazole. The preferred organic compounds mentioned above either alone or in mixture with other compounds can be incorporated in a simple manner in the inorganic carrier material of this invention.

Adsorption or occlusion of nonpolar organic compounds or of organic compounds of low polarity such as hydrocarbons, chlorinated hydrocarbons, unsaturated hydrocarbons, and of compounds having extreme high dielectric constants such as nitro compounds for instance, nitro benzene, nitro methane, and nitriles, is possible when simultaneously including one or more polar organic compounds which can readily be incorporated when used in pure state.

A number of processes can be employed for the preparation of the sorption complexes of this invention. One of these processes comprises suspending the inorganic carrier material in an organic compound which is liquid at room temperature or in a molten organic compound, preferably with stirring.

Another process involves contacting of the inorganic carrier material with a solution of the organic compound.

A further process for the preparation of the sorption complexes of the invention involves the treatment of the carrier material with a gaseous organic compound.

It is also possible to add the organic compound directly to the reaction mixture when preparing the tetra-alkaline earth metal aluminate or ferrite hydrate. Thereby, the adsorption complex is formed simultaneously with the preparation of the carrier material.

The required contact time between the inorganic carrier material and the organic compound to form the adsorption complex can readily be established by taking samples and by X-ray analysis. As soon as the sorption complexes are formed, an increase in the distances between the laminae of the inorganic carrier material is observed.

The alkaline earth metal aluminate and ferrite hydrates used as the carrier materials are preferably prepared according to the following two types of processes:

1. Processes involving the reaction of suitable anhydrous starting materials such as mono- or tricalcium aluminate or tetracalcium aluminate ferrite with water or calcium hydroxide either in the form of pastes or of aqueous suspensions.
2. Processes in which alkali metal aluminates or aluminum hydroxides are allowed to act on alkaline earth metal oxides or hydroxides in aqueous solution. Thereby the function of the alkali metal is essentially to combine the aluminates with the alkaline earth metal component in a especially rapid and smooth manner. The alkali metal hydroxide set free in this reaction is subsequently removed by washing.

The formation of the calcium aluminate hydrates proceeds smoothly at room temperature. For the magnesium aluminate hydrates, it is of advantage to increase the temperature to 100° C. or higher.

The inorganic starting materials which are substituted by inorganic anions such as $SO_4^{21}$, $CO_3^{21}$, $Cl^1$, and others can be prepared in a simple manner by the action of salts of these anions in aqueous solution on the tetracalcium or tetramagnesium aluminate hydrate or ferrite hydrate.

The alkylated alkaline earth metal aluminate hydrates and ferrite hydrates are prepared by treating the inorganic carrier material with alkylating agents such as dialkyl sulfates in alkaline solution.

The sorption complexes of this invention are capable of including additional water in molecular form. Such hydrates are obtained by contacting the inclusion compounds with water or steam.

As stated above, the clathrate or inclusion compounds of this invention can be used for a variety of technical purposes. For instance, it is possible by their use to render cements hydrophobic when incorporating long-chain monocarboxylic acids as hydrophobizing agents into the calcium aluminate hydrates formed during hydration. In the same manner, concrete may be protected from the attack of aggressive solutions. In addition, modification of the cement may be achieved by addition of organic molecules to the hydration products of the cement by adsorbing, for instance, polymerizable organic compounds capable of reacting subsequently with further monomers. Moreover, the swelling property of hydration products of cement with organic substances may be utilized to compensate for the natural shrinkage of the cement stone when setting.

As with bentonites, it is possible to produce systems with particular rheological properties with the adsorption compositions of this invention. Extreme thixotropy in water and organic suspending agents is exhibited by the clathrates of carboxylic acids or, for instance, of ε-amino caproic acid. Extreme rheopexy occurs, for instance, in systems with methanol water. The adsorption complexes of this invention have the particular advantage that, in contrast to the bentonites, their rheological properties are not substantially affected by salt solutions.

In general, modification of the alkaline earth metal aluminate hydrates and/or of the alkaline earth metal ferrite hydrates can be achieved by incorporation of the organic compounds. For instance, compounds having free acidic or basic groups may impart acidic or alkaline properties to the inorganic carrier material.

The adsorption compositions of this invention may be used in all those cases where it is essential that an organic compound which should not be present on storage in free or available form, is released only at the place of use. For instance, insecticides, perfumes, drugs, or dyes may be incorporated in the inorganic carrier materials.

A further very important use is the preparation of adsorption compositions which contain a catalytically active organic material.

Another possible use is the inclusion of chemicals required for photographic processes such as developers, fixing agents, and sensitizers.

The formation of the adsorption complexes in accordance with this invention may also be utilized for the selective separation, isolation, and concentration of organic compounds in analytical and preparative technique.

It is evident, of course, that the present invention is not limited to the examples given hereinabove but that the preparation and composition of the inorganic carrier materials, the organic compounds useful for adsorption or inclusion, the preparation of the adsorption compositions or complexes, and their uses may be varied in accordance with the principles set forth herein and in the claims annexed hereto.

The generic term "inclusion compounds" is used in the claims to designate the adsorption compositions, sorption complexes, inclusion compounds, occlusion compounds, or clathrate compounds of the present invention. The following examples illustrate the present invention:

1. The preparation of the inorganic carrier materials can be done by different methods, as complied by TURRIZIANI in "The Chemistry of Cements," Vol. 1, Academic Press, London and New York (1964), pp. 234–235.

EXAMPLE I

Tetracalcium aluminate hydrate was prepared by solvation of aluminum in $CO_2$-free sodium hydroxide in a proportion corresponding to $NaAlO_2$. This solution was diluted to a concentration of about 0.4 percent NaOH and then treated with the stoichiometrical quantity of CaO and shaken. Filtration is possible after 10 days of shaking. Adsorbed sodium hydroxide can be removed by washing with small quantities of cold water. The product is dried in a vacuum desiccator over $P_2O_5$. After this treatment generally the hydrate $4CaO.Al_2O_3 \cdot 11 H_2O$ is obtained. In preparing tetracalcium aluminate hydrates, extreme care is needed to exclude even traces of $CO_2$.

EXAMPLE II

Tetracalcium aluminate hydrate was prepared by use of aluminous cement (158.0 parts by weight, chemical composition $CaO \cdot Al_2O_3$) mixed with a slurry of CaO (168.2 parts by weight) in 2,000 parts by weight of water. The carrier material so formed was filtered after 10 days of shaking and dried as described in example I.

EXAMPLE III

To prepare tetracalcium aluminate hydrate, $3CaO.Al_2O_3$ (270.2 parts by weight, the preparation of the tricalcium aluminate can be done as compiled by SEELIGMANN, P. and GREENING, N. R. "Studies of Early Hydration Reactions of Portland Cement by X-ray Diffraction," Highway Research Record, 62 (1964), pp. 81–82) was treated with a slurry of CaO (56.1 parts by weight) in 2,000 parts by weight of icewater in a ball mill to avoid lumbs. The filtration and drying process being that described in example I.

EXAMPLE IV

To prepare solid solutions of the general composition $4CaO.(Al_{23}, Fe_2O_3)$ .aq, i.e. tetracalcium aluminate ferrite hydrates, $4CaO.Al_2O_3.Fe_2O_3$ (243.0 parts by weight, so-called Brownmillerite, the preparation of which can be done as compiled by SEELIGMANN and GREENING, 1. c. example III) was mixed with a slurry of CaO (112.2 parts by weight) in 2,000 parts by weight of water. The carrier material so formed was filtered after 10 days of shaking and dried as described in example I.

EXAMPLE V

To prepare tetramagnesium aluminate hydrate a slurry consisting of Periclase (MgO, 161.3 parts by weight), Gibbsite $(Al(OH)_3,$ 78.0 parts by weight) and water (2,000 parts by weight) was refluxed for about 5 days. In contrast to the carrier materials described in examples I to IV in this case a badly crystallized produce is formed. Water is removed firstly by centrifugating and afterwards by the vacuum dry process described in example I.

2. The inorganic starting materials which are substituted by inorganic anions such as $SO_4^{2-}$, $CO_3^{2-}$, $Cl^-$ and others can be prepared as described in example VI to VII. The general formula of these compositions is

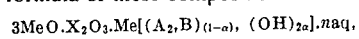
$$3MeO.X_2O_3.Me[(A_2,B)_{(1-\alpha)}, (OH)_{2\alpha}].n\text{aq}.$$

Me is Calcium or Magnesium
X is trivalent iron or aluminum
A are monovalent anions like halides, $NO_3^-$, $MnO_4^-$ and so like
B are divalent anions like $SO_4^{2-}$, $CO_3^{2-}$, $CrO_4^{2-}$ and so like
$n$ is a numeral equal or greater than 6
$\alpha$ is a numeral from 0 to 1. For $\alpha=1$ the starting materials generally do not adsorb interlamellarly organic molecules, except fatty acids. Compositions with $0 < \alpha < 1$ can be advantageous because they need smaller quantities of organic material for complete adsorption.

EXAMPLE VI (see p 12 lines 27–30 and claims 12, 13 and 14) The inorganic starting materials containing inorganic anions such as $SO_4^{2-}$, $CO_3^{2-}$, $Cl^-$ and so like can be produced by use of the procedures of examples I to V except that a part of the CaO or MgO is substituted by the Ca- or Mg-salts of the inorganic anions. The following special example deals with the preparation of a member of the solid solution tetracalcium aluminate hydrate—monosulphate for which B in the above formula means $SO_4^{2-}$ and $\alpha=0.5$: A solution of 0.1349 g. of Al in 100 ml. of 0.2 percent sodium hydroxide was treated with 0.4908 g. of CaO and 0.2152 g. of $CaSO_4.2H_2O$. The suspension was filtered after 10 days of shaking. The basal distance of the resulting crystals still moist with mother liquor is 8.78 A.

EXAMPLE VII

The inorganic starting materials containing inorganic anions such as $SO_4^{2-}$, $CO_3^{2-}$, $Cl^-$ and the like can also be produced by suspending the carrier material described in Examples I to V in solutions containing the alkali salts of the desired anions. The following special example deals with the preparation of a member of the solid solution tetra calcium aluminate hydrate—Friedel's salt for which A in the above formula means $Cl^-$ and $\alpha = 0.5$: A suspension of $4CaO \cdot Al_2O_3 \cdot 11H_2O$ (5.2446g, prepared as described in Example I) in 100 ml of water is treated with 0.2922 g. of NaCl. The suspension was filtered after 10 days of shaking. the basal distance of the crystals when being still moist with mother liquor is 7.92 A.

3. The alkylated carrier materials were prepared in the following manner:

EXAMPLE VIII

Tetracalcium aluminate hydrate (10 parts by weight $4CaO \cdot Al_2O_3 \cdot 11H_2O$, prepared as described in Example I. is added to a solution of dimethyl sulfate (10 parts by weight) in 1,000 parts by weight of 4 percent aqueous solution of sodium hydroxide at room temperature with stirring. The material is filtered, washed with water and dried as described in example I.

EXAMPLE IX

A second alkylated carrier material was produced by use of the procedure of example VIII except that the dialkyl sulfate was diethyl sulfate (12 parts by weight).

4. The clathrate or inclusion compounds of this invention can be prepared in one of the following ways:
   a. As far as the organic compounds form liquids at room temperature or melts at elevated temperatures:

EXAMPLE X

To produce the inclusion compounds of this invention the dried carrier materials or the moist filter cakes of this materials (prepared as described in examples I to IX) were added to an excess of the liquid organic adsorbate at room temperature or to the melt of the desired organic compound at elevated temperatures. The progress of the intercrystalline reactions was controlled by X-ray analysis. Afterwards the excess of the organic liquid was removed by filtration. The following special example deals with the preparation of the complexes of the straight chain aliphatic alcohols with 1 to 10 C-atoms with tetracalcium aluminate hydrate. Tetracalcium aluminate hydrate (in the hydration stage of $4CaO \cdot Al_2O_3 \cdot 11H_2O$) was treated with the normal aliphatic alcohols $C_nH_{2n+1} \cdot OH$ (n=1 to 7) at room temperature and with long chained alcohols (n=8 to 10) at 60°C. For all inclusion compounds the alcoholic component was added in excess (i.e. more than 4 moles of alcohols per mol $4CaO \cdot Al_2O_3 \cdot 11H_2O$). The basal distances reached after sorption process is finished are listed in Table 1. The same results are gained with tetra calcium aluminate hydrate still moist with mother liquor as inorganic starting material.

b. As far as the organic compounds do or do not form liquids at room temperature:

EXAMPLE XI

The intercrystalline adsorption of acids and aldehydes is accompanied by a strong heat liberation. In this case and in the case of organics which are solid at room temperatures it is advantageous to use solutions of this adsorbates. Suitable solvents are liquids which are not or extremely slowly adsorbed or only loosely bounded by the inorganic carrier materials and can be removed easily by filtration or evaporation. Such solvents are hydrocarbons, like hexane, chlorinated hydrocarbons, like chloroform, ether, acetone, acetonitrile, carbon disulfide, benzene, dioxane and many others. For sugars and related compounds like starch, ascorbic acid and the like and for amino acids water is a suitable solvent. In the latter case the water, normally forming hydrates with the pure inorganic carrier material does not interfere the adsorption of these organic adsorbents. The following special example deals with the preparation of the complex of tetracalcium aluminate hydrate with lauric acid dissolved in ether: $4CaO \cdot Al_2O_3 \cdot 11H_2O$ (5.24 parts by weight) are treated with a solution of lauric acid (8.01 parts by weight) in 50 parts by weight of ether. The suspension stiffens immediately forming a gel with thixotropic properties. Considering that the methods described in example X and XI are of general practicableness in preparing the clathrate or inclusion compounds of this invention it is not necessary to give further information for the different organic adsorbates listed on pages 9–10.

c. Example XII illustrates the treatment of the inorganic carrier material with gaseous organic compounds:

EXAMPLE XII

Crystals of tetracalcium aluminate hydrate were smoothed on an X-ray powder specimen holder. The holder was equilibrated in a closed vessel with the vapor of ethylene glycol at 60L C. The inclusion compound formed in this way was identical with the complex reached by treating tetracalcium aluminate hydrate with liquid ethylene glycol in excess at room temperature (basal distance $d\,001 \times 13.7$ A).

d. Example XIII describes the formation of the inorganic carrier material in the presence of organic material; under these conditions the inclusion complexes are formed in situ:

EXAMPLE XIII

Tetracalcium aluminate hydrate was prepared as described in example I except that 2 mole butyric acid were added together with the CaO. After 5 days of shaking a homogeneous grease of high viscosity was reached from which the liquid is not removable by filtration.

e. To illustrate the main forms of imbedding the organic molecules between the sheets of tetracalcium aluminate hydrate see FIG. 1 to 4. These figures show each one X-ray diagram of a typical complex with the formula of the respective adsorbed molecule and the resultant basal expansion. The left-hand part of the figures show a schematic of the molecules (fat lines) between the inorganic layer (shadowed). Under the headline of "moreover," the respective most important classes of organic compounds which are adsorbed with the same principle are listed.
      FIG. 1: (Typical adsorbed organic molecule: D-malic acid). The organic molecules form a one-layer complex with the longitudinal axis of the molecules parallel to the inorganic surface.
      FIG. 2: (Typical adsorbed molecule: ethylene glycol). The organic molecules form a flat two-layer complex.
      FIG. 3: (Typical adsorbed molecule: 1, 10-decanedithiol). Each of the terminal groups of this straightbuilt molecule is bonded to one of the opposing inorganic layers, forming a high angle of intersection.
      FIG. 4: (Typical adsorbed molecule: $a$-naphthoic acid). These complexes are formed by steeply inclined superposed molecules, the functional group of which is bounded to the inorganic sheets.
   f. FIG. 5 presents a survey of the increase of the basal distances ($d001$ A) as a function of the number of C-atoms of homologous series of straight chained molecules with different functional groups. The organic components in these complexes are: I, alcohols; II, mercaptans; III, amines; IV, fatty acids; V, difunctional alcohols (glykols); VI, dicarboxylic acids.

h. To illustrate the sorption capacity of the inorganic carrier materials for organic adsorbents see the sorption isotherms, FIGS. 6 to 7.

FIG. 6 presents the development of basal distances as a function of the concentration of two mercaptans intercalated in tetracalcium aluminate hydrate (TCAH means tetracalcium aluminate hydrate). Saturation is gained at point 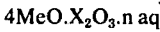. For octylmercaptan saturation is reached with 4 moles of the organic per mol inorganic. Long chained mercaptans beginning with the C-number of 12 already saturate the complexes with two moles of the organic material per mole tetracalcium aluminate hydrate.

FIG. 7 shows the corresponding dependence for three different types of organic acids. 4 moles of organic material per mole tetracalcium aluminate hydrate are needed in the case of fatty acids and phenyl carboxylic acids. Only half of this quantity of organic molecules is needed for full complexing tetracalcium aluminate hydrate with dicarboxylic acids.

i. To illustrate the possibility of simultaneous adsorption of two or more different organics, see FIGS. 8 to 9.

FIG. 8 shows a) the X-ray diagram of the complex of tetracalcium aluminate hydrate with n-hexylamine, c) the corresponding complex with phenyl butyric acid and b) the complex reached with an equimolare mixture of both hexylamine + phenyl butyric acid. The basal distance of the latter complex proves that both sorts of organic molecules are simultaneously intercalated.

FIG. 9 shows the development of basal distances for complexes of tetracalcium aluminate hydrate with a complete series of aliphatic amines. The upper line means (for comparison) the complexes formed with pure amines, the lower line stands for equimolare mixtures of these amines with methanol.

Table 1

| Alcohol | basal distance (A.) | difference (A.) |
| --- | --- | --- |
| $CH_3OH$ | 12.90 | |
| | | 2.8 |
| $CH_3CH_2OH$ | 15.72 | |
| | | 1.7 |
| $CH_3(CH_2)_2OH$ | 17.40 | |
| | | 2.8 |
| $CH_3(CH_2)_3OH$ | 20.20 | |
| | | 1.8 |
| $CH_3(CH_2)_4OH$ | 22.00 | |
| | | 2.7 |
| $CH_3(CH_2)_5OH$ | 24.66 | |
| | | 1.8 |
| $CH_3(CH_2)_6OH$ | 26.56 | |
| | | 2.7 |
| $CH_3(CH_2)_7OH$ | 29.28 | |
| | | 2.5 |
| $CH_3(CH_2)_8OH$ | 31.77 | |
| | | 4.4 |
| $CH_3(CH_2)_9PH$ | 36.19 | |

I claim:

1. A clathrate compound of increased stability consisting essentially of an inorganic absorbent carrier of crystalline orderliness and uniformity of chemical and physical properties, and electrostatically neutral of the formula $4MeO \cdot X_2O_3 \cdot n$ aq wherein
Me is calcium or magnesium,
X is a member selected from the group consisting of trivalent iron and aluminum,
aq is water of crystallization, and
n is a numeral of at least 7, having releasably incorporated in and intercalated between the individual inorganic layer lattices thereby increasing the interlaminar distance, a polar organic compound selected from the group consisting of monohydric aliphatic alcohols with one to 10 carbon atoms, glycols with two to 10 carbon atoms, polyhydric alcohols with five and six carbon atoms, carbohydrates, ascorbic acid, aliphatic mercaptans with one to 16 carbon atoms, aliphatic dithiols with two to 10 carbon atoms, aliphatic mono-amines with one to 14 carbon atoms, aliphatic di-amines with one to 9 carbon atoms, aliphatic aldehydes with one to 16 carbon atoms, aliphatic ketones, aliphatic mono carboxylic acids with one to 14 carbon atoms, aliphatic hydroxy mono carboxylic acids, aliphatic dicarboxylic acids with two to 10 carbon atoms, aliphatic amino carboxylic acids, aliphatic carboxylic acid amides, aliphatic carboxylic acid esters, aliphatic thiocarboxylic acid amides, cycloaliphatic alcohols, cycloaliphatic carboxylic acids, cycloaliphatic aldehydes, cycloaliphatic amines, phenols, aromatic amines, amino phenols, aromatic aldehydes, aromatic carboxylic acids, aromatic sulfonic acids, aromatic-aliphatic alcohols, aromatic-aliphatic amines, and aromatic-aliphatic carboxylic acids, said polar organic compound being determinably releasable.

2. Clathrate compound according to claim 1, wherein the inorganic carrier material contains 7 molecules of water structurally bound thereto.

3. Clathrate compound according to claim 1, wherein the inorganic carrier material is a tetracalcium aluminate hydrate.

4. Clathrate compound according to claim 1, wherein the inorganic carrier material is a tetramagnesium aluminate hydrate.

5. Clathrate compound according to claim 1, wherein the inorganic carrier material is a tetracalcium ferrite hydrate.

6. Clathrate compound according to claim 1, wherein the inorganic carrier material is a tetramagnesium ferrite hydrate.

7. The clathrate compound of claim 1 and a substantially nonpolar organic compound also adsorbed in the inorganic carrier selected from the group consisting of saturated and unsaturated hydrocarbons, chlorinated hydrocarbons, nitrobenzine, nitromethane and nitriles.

8. A clathrate compound of increased stability consisting essentially of an inorganic absorbent carrier of crystalline orderliness and uniformity of chemical and physical properties and electrostatically neutral selected from tetracalcium aluminate hydrates, tetramagnesium aluminate hydrates, tetracalcium ferrite hydrates and tetramagnesium ferrite hydrates having releasably incorporated in and intercalated between the individual inorganic layer lattices, thereby increasing the interlaminar distance, a long-chain aliphatic carboxylic acid.

9. The clathrate compound of claim 8 wherein the inorganic carrier is tetracalcium aluminate hydrates.

10. The clathrate compound of claim 1 in which the polar organic compound is a polysaccharide.